April 27, 1926.
W. L. FAIRCHILD
1,582,255
PROCESS FOR VULCANIZING AUTO TIRES
Filed Oct. 16, 1922
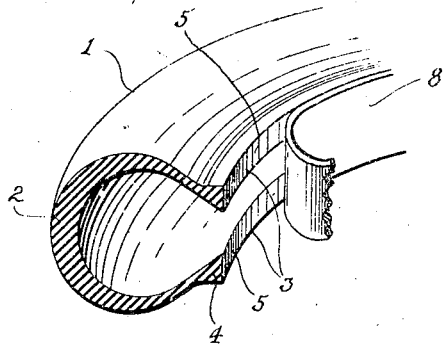
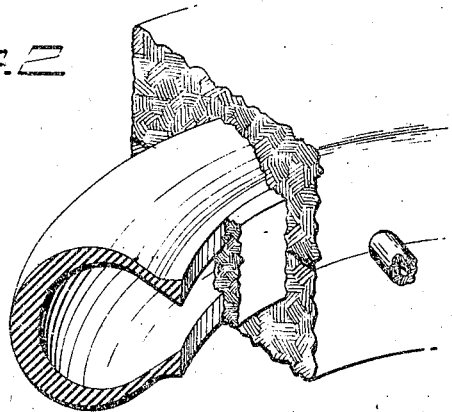
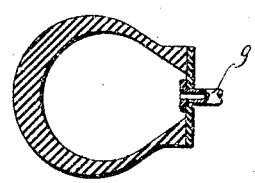
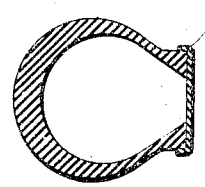
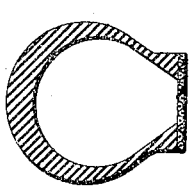
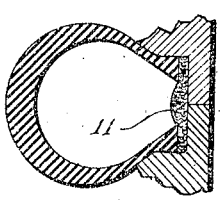
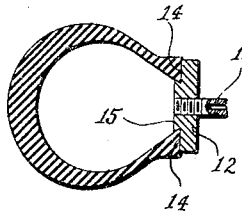
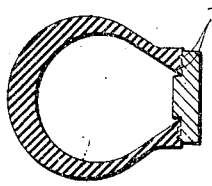
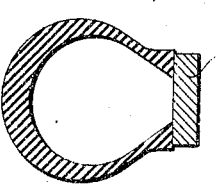
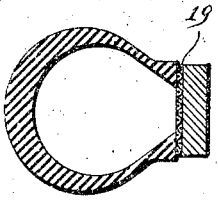
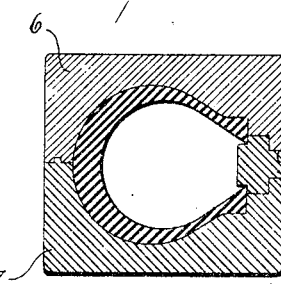
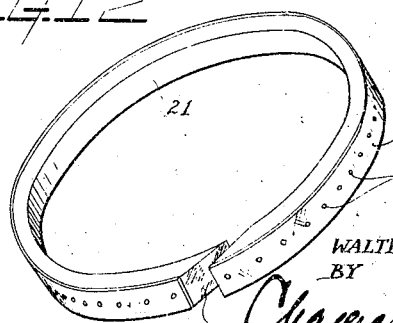
INVENTOR:
WALTER L. FAIRCHILD
BY
ATTORNEY.

Patented Apr. 27, 1926.

1,582,255

UNITED STATES PATENT OFFICE.

WALTER L. FAIRCHILD, OF NEW YORK, N. Y.

PROCESS FOR VULCANIZING AUTO TIRES.

Application filed October 16, 1922. Serial No. 594,706.

*To all whom it may concern:*

Be it known that I, WALTER L. FAIRCHILD, a citizen of the United States, residing at New York, county and State of New York, have invented certain new and useful Improvements in a Process for Vulcanizing Auto Tires, of which the following is a specification.

This invention relates to a process for vulcanizing automobile tires, and more specifically aims to provide a process by means of which a tire shoe may be vulcanized simultaneously on its interior and exterior surfaces.

In my previous application for U. S. Letters Patent filed December 10, 1921, Serial No. 521,391 entitled "Vulcanizing apparatus" I showed a device by means of which hollow articles, such as inner tubes may be vulcanized in a single operation, and in the final form in which they are to be used. In that application I disclosed means by which the inner tube was placed in the machine in its final form as a closed ring, and there vulcanized without the use of a mandrel. In that machine the inner tube was placed within a suitable mold, and vulcanizing gas was introduced under pressure, into the interior thereof, this pressure insuring that the tube would be forced into complete contact with the interior surfaces of the mold, and furthermore, making it possible by heating the mold and the vulcanizing gas to vulcanize the tube simultaneously both from within and from without. I have found the vulcanizing machine which I there described suitable for use not only in the manufacture of inner tubes, but have also discovered that the principle on which that machine was based may also be applied to the manufacture of tire shoes. Obviously, inasmuch as the tire shoe is a ring open along its inner periphery, some means must be provided by which the shoe may be hermetically sealed so that a vulcanizing gas may be introduced into the interior thereof during the heat treatment.

As tire shoes are at present vulcanized, it is customary to support the shoe and maintain it in contact with the inner surfaces of the mold in two ways. In the process as formerly used, the shoe was placed about a mandrel, and the mandrel and shoe then placed within the mold, whereupon the assembled parts were heated such a length of time as was necessary. The latter development, however, substituted a collapsible air bag in place of the metallic mandrel, this air bag being constructed so that air under pressure might be introduced therein to keep the shoe in distended position during the vulcanization process.

In the use of a solid mandrel no provision was made by means of which this mandrel could be heated, and as a result the vulcanization proceeded from the exterior of the tire, which was in contact with the heated mold, inwardly toward that portion in contact with the mandrel. In order to make sure that the inner portions of a shoe were completely vulcanized, it proved to be necessary in many instances to over-vulcanize the tread portion, and under the best conditions it was impossible to insure an even vulcanization of the shoe throughout the various layers. In the case of the air bag, a somewhat superior result was obtained, the air bag permitting sufficient pressure to be placed interiorly of the shoe to insure that all parts of the tread would lie in contact with the mold, but these air bags were an added source of expense, while not entirely obviating the difficulties previously pointed out.

One of the objects of this invention, therefore, is to provide a process by means of which a tire shoe may be vulcanized, the vulcanization taking place evenly throughout all parts of the tire.

Another object of the invention is to provide a process for vulcanizing tire shoes by means of which the shoe may be vulcanized simultaneously both on its exterior and interior surfaces.

Another object of the invention is to provide a process by which a tire shoe may be evenly vulcanized both from within and from without, the progress of the vulcanization being at all times under exact control.

A further object of the invention is to provide a process by means of which the entire shoe may be vulcanized, the vulcanization process being carried on under exact control, and without the necessity of providing an interior support for the shoe.

Another object of the invention is to provide a process by means of which the shoe may be evenly vulcanized throughout its thickness without the necessity of providing mandrels, air bags, or other means by which the shoe will be held in contact with the interior surfaces of the mold.

Another object of the invention is to provide a process by means of which the vulcanization of a tire shoe may be cheaply and inexpensively carried on, this process being under the exact control at all times, whereby the progress of the vulcanization may be regulated as desired.

Another object of the invention is to provide a process for the vulcanization of a tire shoe, by means of which the vulcanization process may be carried on both from the interior and exterior of the carcass, thereby greatly shortening the length of time necessary for the exposure of the shoe to the heat treatment and obviating the expense of shoe supporting means.

Another object of the invention is to provide a process by means of which a tire shoe may be vulcanized, the shoe being supported in the mold in such a way as to provide a closed chamber, whereby the vulcanizing may be carried on both on the interior and exterior surfaces of the shoe, this process being under complete control at all times, so that the rate of vulcanization may be regulated, and furthermore, being inexpensive to operate, and requiring no expert attention.

Other objects and aims of the invention, more or less specific than those referred to above, will be in part obvious and in part pointed out in the course of the following description of the elements, combinations, arrangements of parts and applications of principles, constituting the invention; and the scope of protection contemplated will be indicated in the appended claims.

In the accompaying drawing, wherein I have shown preferred forms of embodiment of my invention:

Figure 1 shows a view in perspective of a portion of the shoe, together with the means by which the face is hermetically sealed.

Figure 2 is a view in perspective, showing a section of a tire held within the mold.

Figures 3, 4, 5 and 6 are cross-sectional views of a shoe, showing one type of the means by which the shoe is hermetically sealed.

Figures 7, 8, 9 and 10 are cross-sectional views of a shoe showing a modified type of means by which the shoe is sealed.

Figure 11 is a cross-sectional view through a mold, showing the shoe positioned in place therein and sealed; and Figure 12 is a view in perspective of one form of sealing means.

Referring now to the drawing, wherein similar reference characters refer to similar parts throughout the several views thereof, the reference character 1 indicates the carcass or shoe of a tire, formed with a thickened tread portion 2 and a pair of beads 3, those beads being spaced apart so that the cross-sectional contour of the shoe is similar to that of a horseshoe. The beads, as indicated, are ordinarily thickened and provided with interior reinforcing means at the point indicated by the reference character 4, the beads being further provided with flattened surfaces 5, which surfaces are adapted to lie in contact with the rim when the shoe is mounted in position.

As has been briefly explained above, the principle of this invention depends upon the introduction of a vulcanizing gas of suitable chemical composition into the interior of the shoe, while the latter is positioned within the mold. As is indicated in Figure 11, the mold customarily consists of a pair of co-operating members 6 and 7, which are provided with deep opposed recesses adapted to form a chamber for the shoe when the members are placed in opposed relation. In the former vulcanizing processes, the core or mandrel about which the shoe was laid, together with the shoe thereon, is placed in the recess in one of the mold members. The second mold member is then laid thereover, and forced in position, whereupon the mold members are clamped together and the whole mold, with the shoe therein, placed in a heating oven or vulcanizing chamber. Instead of using a solid core mandrel, it has also been the practice to strip the shoe from the mandrel on which it is formed and to insert a collapsible bag within it, air under pressure being introduced into this bag, so as to force the shoe into contact with the mold. In the case of shoes which are to be provided with a roughened or corrugated tread surface, such as known as the "non-skid tire", the inner surface of the mold is provided with suitable depressions into which these corrugations may fit, so that the interior structure of the mold will determine the character of the exterior surface of the tire.

In the present invention I desire to make use of the principle of introducing a vulcanizing gas which is heated and under pressure, into the interior of the shoe, this gas providing means not only for keeping the shoe in distended position against the interior faces of the mold, but furthermore, providing means by which the interior surfaces of the shoe may be vulcanized. By such an arrangement it is possible to carry on the vulcanization evenly, both interiorly and exteriorly of the carcass. Obviously, such an arrangement will greatly reduce the length of time necessary for a vulcanization process, and furthermore, will save air bags, or mandrels, which are a considerable item of expense.

As an additional desirable feature, the introduction of a heated vulcanizing gas makes it possible to regulate exactly the speed at which the vulcanizing process takes place. While I have shown in the drawings the standard form of mold members, which are to be placed in an oven, this form of mold is shown here merely for purposes of illustration, and I prefer to carry on the process in a machine similar to that disclosed in my application referred to. In that machine the molds are provided with jackets into which steam, or some other heating medium, may be introduced, and by such an arrangement it is possible to regulate the heat which will be applied both exteriorly and interiorly of a shoe. Inasmuch as the shoe is not a closed body, it is necessary to provide some means, which will be applied to the flat surfaces of the beads, so as to make the shoe a closed chamber. I provide several different types of sealing means in two modified forms, as shown in the drawings.

In the simplest form I may use for sealing purposes a thin strip of raw rubber, illustrated at 8 in Figure 1. This rubber will be placed in contact with the flat surfaces of the beads, and by reason of the strip and the shoe being formed of rubber in the raw condition, the two will adhere. As is shown in Figure 3, it is necessary to provide some means to introduce the vulcanizing gas usually steam into the interior of the shoe, and I, therefore, provide the strip with a plurality of inlets 9, which may be positioned at any suitable place in the strip, the mold being provided with a suitable channel through which these inlets project. One inlet may be used if desired but I prefer to introduce the vulcanizing gas through a plurality of inlets connected to a common source of gas. I also provide one or more outlets similar to inlet 9 but provided with pressure control valves so arranged that the gas may circulate through the interior of the shoe while the pressure is maintained. The conduit for the vulcanizing gas will be connected to the inlet and the conduit is provided with valves by which the flow of gas into the shoe may be controlled. As is shown in Figure 3, the edges of the strip register with the edges of the bead, although I show a slightly modified form in Figure 4, in which the strip is intended to overlap the edges of the bead slightly, as shown at 10. Either of these forms may be used, the method of application being the same.

With the strip applied, as is indicated in Figure 1, the shoe is introduced into a mold in the usual manner, and with the two halves of the mold clamped in position, the heating medium is introduced into the heating jacket for the mold. As has previously been explained in my prior application, means is provided to exhaust the interior of the shoe, and after this exhaustion has taken place by connecting the inlet 9 to a vacuum pipe, the heated vulcanizing gas is introduced into the closed chamber formed by the shoe and the strip. The heating of the mold is then carried on such a length of time as is necessary, the shoe being vulcanized equally on its interior and exterior surfaces.

Obviously, the strip, which is of raw rubber, will be vulcanized to the beads, and when the vulcanization is completed, the shoe will be withdrawn from the mold and the sealing strip cut away. It is not necessary to remove the strip entirely since it will be made of thin material, but, if desired, only that portion of the strip which lies between the beads may be cut away, the portions of the strip overlying the beads being left in place. This will interfere in no way with the utility of the shoe, as will be obvious.

The same principle of operation applies to the strip shown in Figure 4, the strip in this form providing a slightly better seal. In Figure 5 there is shown a different form of strip, which may be here constructed of textile material, such as webbing. The surfaces of this fabric may be coated with raw rubber, if desired so that the strip will adhere to the bead, although the uncoated web will work equally well. The strip is used in the same manner as has previously been described, but may be more readily torn from the bead, whereupon the strip of webbing may be again coated with raw rubber and used an indefinite number of times. In the form shown in Figure 6, the strip is made of a fibrous material which is somewhat elastic. This material may be coated with raw rubber or used in uncoated condition in the manner before described. Due to the elastic nature of this type of strip, when it is pressed into position against the flat surfaces of the bead, a portion thereof, indicated at 11, will project a slight distance into the interior of the shoe, this insuring a tight contact at the pointed edges of the bead, thereby making more secure the sealing.

In the forms of sealing strip shown in the remaining figures, I use a metallic ring, as indicated by the numeral 12, which is provided with the customary form of inlet 13, and has flat surfaces 14 along either edge. Between the flat surfaces the strip projects into the interior of the shoe slightly, as at 15, the outline of this projecting portion being similar to a keystone. The projecting portion has inwardly extending channels on either lateral surface, into which the pointed edge of the bead may extend. This metallic ring will be positioned in the manner indicated in Figure 11, as at 16, and is of such size that the shoe will be forced into the channels on either side of the projecting portion by the contour of the mold. The process of vulcanization is carried on in the same manner as before, the pressure of the vulcanizing gas insuring that the bead will lie firmly in contact with the strip so as to prevent the escape of the gas under pressure.

In the form of strip indicated in Figure 8, it will be seen that the strip is provided with sharp circumferential ribs 17, these being adapted to project a short distance into the face of the bead, thereby insuring that the bead will be held firmly in position, and furthermore, providing a better seal. It will be understood, of course, that the sealing means is ordinarily applied before the shoe is introduced into the mold, the two being placed in position together. If desired, however, I may use a flat strip, such as is shown in Figure 9 at 18, this type of strip being cheapest to construct and serving its purpose equally with those previously shown, being slightly less convenient to handle, however.

In the form shown in Figure 10, I provide a ring similar to that shown in Figure 9, but preferably place a layer of material on the inner side of the strip which is to lie in contact with the beads. This strip of material, indicated at 19, will be somewhat similar to the strip shown in Figure 5, that is to say, it may be in the form of a layer of textile material, suitably impregnated with raw rubber, if desired.

Figure 2 illustrates the manner in which the sealing ring is to be mounted in position, and Figure 11 illustrates an alternative form of sealing ring which may be used in connection with the old form of mold. In that type the mold members did not contact with each other along the interior surfaces of the shoe, but were spaced apart, as is indicated at 20, so as to permit of an extending portion of the core to lie therebetween. The sealing means used in connection with such mold forms will necessarily have its outer surface shaped so as to conform to the shape of the mold members, and has, therefore, a projecting portion which lies between the mold members. The surface of the strip which contacts with the edges of the bead, however, is preferably in one of the forms illustrated in Figures 7 to 10 inclusive.

In Figure 12 I show a ring somewhat similar to that illustrated in Figure 10, being constructed of a metallic portion 21, which is faced with a layer of material, such as is illustrated in Figure 10. This layer 22 may, if desired, be provided with attaching means illustrated at 23, to hold the strip in contact with the face of the ring. As is shown at 24, the ring is not closed, but at its ends is provided with overlying portions so that the ring is capable of slight expansion, being very similar to the common form of piston ring. The gap may be constructed in various ways as desired. This spring ring will be used in the same manner as has previously been described.

When the shoe has been placed in the mold with the ring in position, and the second half of the mold forced in contact therewith, it will be seen that the shoe forms a closed chamber, capable of confining the gas which is to be used for the vulcanization. This gas, as I have stated, will be preheated, and will be of a chemical character, which will assist in the vulcanization process.

It will be seen then that by the process which I have here set forth, it is possible to vulcanize the shoe, both on its interior and exterior surfaces, without the necessity of providing mandrels, air bags, or other means by which to maintain the shoe in contact with the inner faces of the mold. Furthermore, by vulcanizing the shoe on its inner and outer faces simultaneously, the length of time from which the heat treatment is to be continued, will be greatly shortened, and the rate at which the vulcanization is to progress, may also be closely regulated. It will be understood that in some cases the rapid vulcanization is entirely satisfactory, while in others, the character of the rubber is such that it would be preferable to vulcanize slowly for a considerable period of time. Either of these conditions may be readily established by my process. The shoe is in its final form when vulcanization is complete, except for removing the sealing strip. In the event that a metallic strip is used, this may be quickly slipped from place, while if a strip made of raw rubber is used, as has been explained in connection with Figures 3 and 4, it will be necessary to cut the strip or remove a portion between the beads. If the coated fabric is used, this may be easily torn away. Either of these operations is simply and easily carried on. This process is inexpensive, owing to the saving in the period of heating, and also saves the expense of air bags, these being capable of use only a few times, and being much more expensive than a strip of raw rubber, which I use for sealing purposes.

Obviously, the metallic rings which I have shown as an alternative form of sealing means may be used indefinitely. While I have shown the mold members of the old form in which the mold with the article therein are to be placed in an oven, it will be clear that I may use individually heated mold members as previously described. I do not desire, therefore, to confine myself to any particular type of mold, since my process will be satisfactorily operated with any of the present known forms.

As many changes could be made in this construction without departing from the scope of the following claims, it is intended that all matter contained in the above description or shown in the accompanying drawings shall be interpreted as illustrative only and not in a limiting sense.

Having thus described my invention, what I claim as new and desire to secure by Letters Patent is:

1. A process of the class described which consists in applying a strip of raw rubber to the beads of a shoe thereby closing the space between the beads and sealing the interior of the shoe, confining the shoe and the strip in a detachable mold, vulcanizing the shoe and strip by introducing steam interiorly, removing the mold and cutting away the strip between the beads.

2. A process of the class described which consists in applying a strip of raw rubber to the beads of a shoe thereby closing the space between the beads and sealing the interior of the shoe, backing the strip externally with a heavier annular member, confining the shoe and strip and backing member in a detachable mold, vulcanizing the shoe and strip by introducing steam interiorly, removing the mold and backing member and cutting away the strip between the beads.

3. A process of the class described which consists in applying a sealing strip to the beads of a shoe whereby to seal the interior thereof, confining said sealed shoe within a mold, introducing a vulcanizing gas into the interior of said shoe, heating said mold whereby to vulcanize said shoe, and to cause said sealing means to adhere to the beads thereof, removing said mold and separating said means along a line parallel to and between the edges of said beads.

4. A process of the class described which consists in applying sealing means to the beads of a shoe whereby to cause the latter to form a closed chamber, confining said sealed shoe within a mold, introducing a vulcanizing gas under pressure into the interior of said sealed shoe while heating said mold, discontinuing the application of heat and the introduction of said gas, removing said mold and removing that portion of said strip lying between the inner edges of said beads.

5. A process of the class described which consists in applying a rubber sealing strip to the beads of a shoe, confining said sealed shoe within a mold, introducing a vulcanizing gas under pressure into the interior of said shoe while heating said mold, discontinuing said heating and the introduction of said gas, removing said mold and cutting said sealing means along a line parallel to and between the inner edges of said beads.

6. A process of the class described which consists in uniting the beads of a shoe by means of a strip whereby to seal the interior of said shoe, confining said sealed shoe within a mold, causing a vulcanizing gas to circulate within said shoe under pressure, heating the exterior surface of said shoe, discontinuing said heating and said circulation, removing said shoe from said mold, and dividing said sealing means into two parts along a line passing between said beads.

7. A process of the class described which consists in uniting the beads of a shoe by means of a strip whereby to seal the interior of said shoe, confining said sealed shoe within a mold, causing a vulcanizing gas to circulate within said shoe under pressure, heating the exterior surface of said shoe, discontinuing said heating and said circulation, removing said shoe from said mold, and removing that portion of said strip lying between the inner edges of said beads.

In testimony whereof, I affix my signature.

WALTER L. FAIRCHILD.